(12) United States Patent
Kurosawa et al.

(10) Patent No.: US 11,465,604 B2
(45) Date of Patent: Oct. 11, 2022

(54) VEHICLE CONTROL METHOD AND VEHICLE CONTROL DEVICE

(71) Applicant: Nissan Motor Co., Ltd., Yokohama (JP)

(72) Inventors: Takahisa Kurosawa, Kanagawa (JP); Satomi Eto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 56 days.

(21) Appl. No.: 16/771,337

(22) PCT Filed: Dec. 15, 2017

(86) PCT No.: PCT/JP2017/045163
§ 371 (c)(1),
(2) Date: Jun. 10, 2020

(87) PCT Pub. No.: WO2019/116552
PCT Pub. Date: Jun. 20, 2019

(65) Prior Publication Data
US 2020/0339097 A1    Oct. 29, 2020

(51) Int. Cl.
*B60W 10/08*    (2006.01)
*B60K 6/46*    (2007.10)
*B60W 20/13*    (2016.01)
*B60W 10/26*    (2006.01)

(52) U.S. Cl.
CPC .............. *B60W 10/08* (2013.01); *B60K 6/46* (2013.01); *B60W 10/26* (2013.01); *B60W 20/13* (2016.01)

(58) Field of Classification Search
None
See application file for complete search history.

(56) References Cited

U.S. PATENT DOCUMENTS

| 2015/0046006 | A1* | 2/2015 | Shimoyama | ........ B60W 40/076 701/22 |
| 2015/0051766 | A1* | 2/2015 | Matsui | ................. B60W 10/115 701/22 |
| 2017/0274888 | A1* | 9/2017 | Suzuki | ..................... B60K 6/26 |

FOREIGN PATENT DOCUMENTS

| JP | 2000-0179371 A | 6/2000 |
| JP | 2010179882 A | 8/2010 |
| JP | 2013189048 A | 9/2013 |
| JP | 2017171256 A | 9/2017 |

* cited by examiner

*Primary Examiner* — Todd Melton
*Assistant Examiner* — Jason R Roberson
(74) *Attorney, Agent, or Firm* — Young Basile Hanlon & MacFarlane, P.C.

(57) ABSTRACT

In a vehicle control method, when drive force which a second electric motor is requested to output increases in a state where an internal combustion engine is stopped, drive force which the second electric motor outputs by using electric power supplied by a battery is limited to a lower level than maximum drive force determined from electric power which can be supplied by the battery to drive an electric-powered vehicle. Then, the drive force which the second electric motor outputs by using the electric power supplied by the battery is increased over time in a period from when the second electric motor outputs the drive force limited to the lower level to when the internal combustion engine is fired up and a first electric motor starts power generation.

13 Claims, 8 Drawing Sheets

VEHICLE CONTROL METHOD AND VEHICLE CONTROL DEVICE

TECHNICAL FIELD

The present invention relates to a vehicle control method and a vehicle control device.

BACKGROUND

Japanese Patent Application Publication No. 2000-179371 discloses an invention relating to control of drive force in a hybrid vehicle in which an engine and a motor generator are combined. Specifically, target drive force is calculated from vehicle speed and a step-on amount of an accelerator, motor drive force to be generated by using electric power which a battery can supply is calculated based on the vehicle speed and a state of charge of the battery, and then drive force which the engine is requested to output is calculated from a value obtained by subtracting the motor drive force from the target drive force.

SUMMARY

However, in Japanese Patent Application Publication No. 2000-179371, in a period from when the accelerator is stepped on to when the engine is fired up and the motor generator starts power generation, the vehicle has to travel only by using the drive force (motor drive force) generated by using the electric power which the battery can supply. Since there is a time lag between output of the motor drive force and the start of the power generation, the drive force (drive torque) does not increase over time and stagnation occurs. Accordingly, smooth acceleration feeling or acceleration feeling expected in response to the stepping-on of the accelerator cannot be obtained and a driver or other occupants of the vehicle feels discomfort or frustration in some cases.

The present invention has been made in view of the aforementioned problem and an object thereof is to provide a vehicle control method and a vehicle control device which can achieve smooth acceleration feeling by smoothly and continuously increasing acceleration G.

In order to solve the aforementioned problem, in a vehicle control method according to one aspect of the present invention, when drive force which a second electric motor is requested to output increases in a state where an internal combustion engine is stopped, drive force which the second electric motor outputs by using electric power supplied by a battery is limited to a lower level than maximum drive force determined from electric power which the battery is capable of supplying to drive an electric-powered vehicle. Then, the drive force which the second electric motor outputs by using the electric power supplied by the battery is increased over time in a period from when the second electric motor outputs the drive force limited to the lower level to when the internal combustion engine is fired up and a first electric motor starts power generation.

The vehicle control method and the vehicle control device of the present invention can achieve smooth acceleration feeling by smoothly and continuously increasing acceleration G.

DETAILED DESCRIPTION

Next, an embodiment of the present invention is described in detail with reference to the drawings. In the description, the same parts are denoted by the same reference numerals and overlapping description is omitted.

Figure 1:
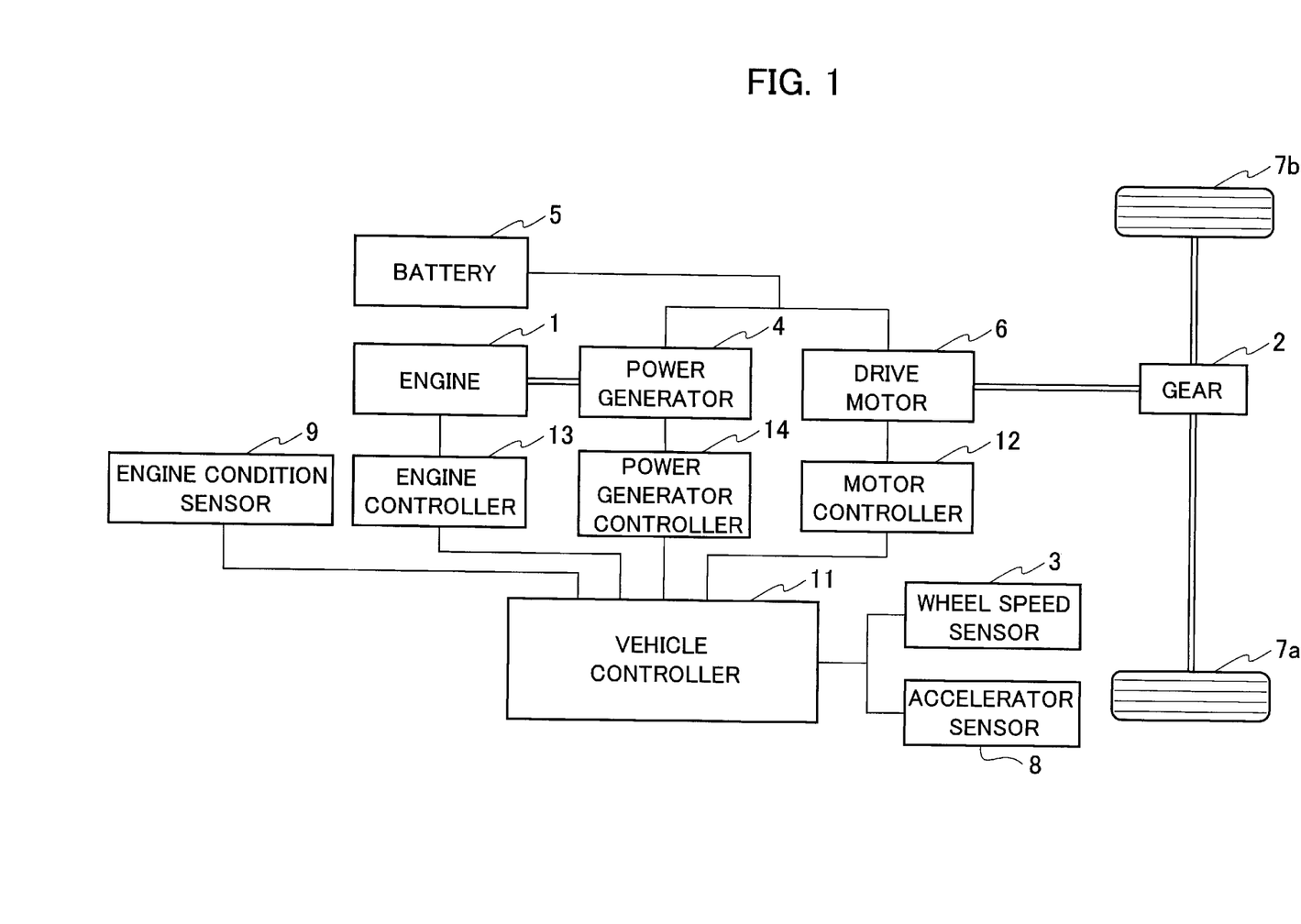
FIG. 1 is a block diagram illustrating a configuration of a hybrid car including a vehicle control device (vehicle controller 11) according an embodiment of the present invention.

A configuration of an electric-powered vehicle in which a vehicle control device according to the embodiment is mounted is described with reference to FIG. 1. The electric-powered vehicle of the embodiment is a series hybrid car including: an engine 1 (internal combustion engine); a power generator 4 (first electric motor) mechanically connected to an output shaft of the engine 1; a battery 5 electrically connected to the power generator 4; drive wheels 7a, 7b configured to drive the electric-powered vehicle; a drive motor 6 (second electric motor) mechanically connected to the drive wheels 7a, 7b; a motor controller 12 configured to control the drive motor 6; a power generator controller 14 configured to control the power generator 4; an engine controller 13 configured to control the engine 1; an engine condition sensor 9 configured to detect conditions of the engine 1 including the number of revolutions and oil temperature of the engine 1; a wheel speed sensor 3 configured to detect wheel speed; an accelerator opening degree sensor 8 configured to detect an accelerator opening degree APO; and a vehicle controller 11 configured to control the entire powertrain of the electric-powered vehicle. In the series hybrid car, the engine 1 does not drive the drive wheels 7a, 7b and the drive motor 6 drives the drive wheels 7a, 7b.

The output shaft of the engine 1 is mechanically connected to the input shaft of the power generator 4. The power generator 4 is electrically connected to the battery 5 and the drive motor 6 to be capable of exchanging electric power (high power) therewith. The output shaft of the drive motor 6 is mechanically connected to an axle via a gear 2 and the axle is mechanically connected to the drive wheels 7a, 7b.

The motor controller 12 and the drive motor 6, the power generator controller 14 and the power generator 4, and the engine controller 13 and the engine 1 are connected to one another to be capable of exchanging electric signals (low power). Moreover, the motor controller 12, the power generator controller 14, and the engine controller 13 are connected to the vehicle controller 11 to be capable of exchanging electric signals (low power) therewith.

The engine condition sensor 9 sends the detected engine conditions to the vehicle controller 11 as electric signals. The engine condition sensor 9 includes an engine oil temperature detection sensor and an engine speed detection sensor. The wheel speed sensor 3 sends the detected wheel speed to the vehicle controller 11 as electric signals. The accelerator opening degree sensor 8 sends the detected accelerator opening degree APO to the vehicle controller 11 as electric signals.

The drive force of the engine 1 is transmitted to the power generator 4 and the power generator 4 generates electric power by using the drive force of the engine 1. The electric power generated by the power generator 4 is transmitted to the drive motor 6 or is stored in the battery 5. The electric power stored in the battery 5 is transmitted to the drive motor 6 and the drive motor 6 is driven by the electric power stored in the battery 5 and the electric power generated by the power generator 4. The drive force of the drive motor 6 is transmitted to the drive wheels 7a, 7b via a gear 2 and the axle. The drive wheels 7a, 7b are rotated by the drive force of the drive motor 6 and the electric-powered vehicle (hereafter, referred to in short as vehicle) travels.

The vehicle controller 11 functions as the vehicle control device according to the embodiment.

For example, the vehicle controller 11 can be implemented by a general-purpose micro-computer including a CPU (central processing unit), a memory, and an input-output unit. A computer program (vehicle control program) which causes the micro-computer to function as the vehicle controller 11 is installed in the micro-computer and is executed. The general-purpose micro-computer thereby functions as the vehicle controller 11. Note that, although the example in which the vehicle controller 11 is implemented by software is described herein, the vehicle controller 11 may be configured by preparing dedicated hardware for executing the following information processes, as a matter of course. Moreover, multiple units (21 to 26 and 31 to 35) included in the vehicle controller 11 may be configured of separate pieces of hardware. Furthermore, in addition to the vehicle controller 11, the motor controller 12, the power generator controller 14, and the engine controller 13 may be similarly implemented by software or dedicate hardware. Moreover, an electronic control unit (ECU) used for other control relating to the vehicle may also serve as the vehicle controller 11, the motor controller 12, the power generator controller 14, and the engine controller 13.

Functional components included in the vehicle controller 11 are described with reference to FIG. 2. The vehicle controller 11 includes a drive force converter 21, a rate limiter processor 22, a filter processor 23, a stretchiness processor 24, a safety determiner 25, and a power generation control unit 26. The stretchiness processor 24 includes a control start determiner 31, a power generation requester 32, and a Gj adder 33. The Gj adder 33 includes a Gj1 adder 34 and a Gj2 adder 35.

The drive force converter 21 calculates drive force (driver request drive force) which a driver requests the drive motor 6 to output from the accelerator opening degree APO detected by the accelerator opening degree sensor 8 and the wheel speed detected by the wheel speed sensor 3. The vehicle controller 11 has in advance a not-illustrated drive force map. The drive force map is a graph depicting relationships between the vehicle speed and the driver request drive force and the vehicle controller 11 has the drive force map for each accelerator opening degree.

The rate limiter processor 22 performs a rate limit process of adding certain limit to a change rate of the driver request drive force and making changes in the driver request drive force smoother to suppress abrupt changes in the driver request drive force. Thereafter, the filter processor 23 performs a low-pass filter process on the driver request drive force to make the changes in the driver request drive force even smoother.

The driver request drive force subjected to the filter process is inputted into the stretchiness processor 24. "Stretchiness" is a phenomenon in which smooth acceleration feeling or acceleration feeling expected in response to stepping-on of the accelerator cannot be obtained. The "stretchiness" is described later with reference to the graph of FIG. 8.

In order to suppress the stretchiness, first, the stretchiness processor 24 limits drive force Fm outputted by the drive motor 6 to a lower level than maximum drive force determined from the electric power (drive Pout) which can be supplied by the battery 5 to drive the vehicle.

Figure 5:
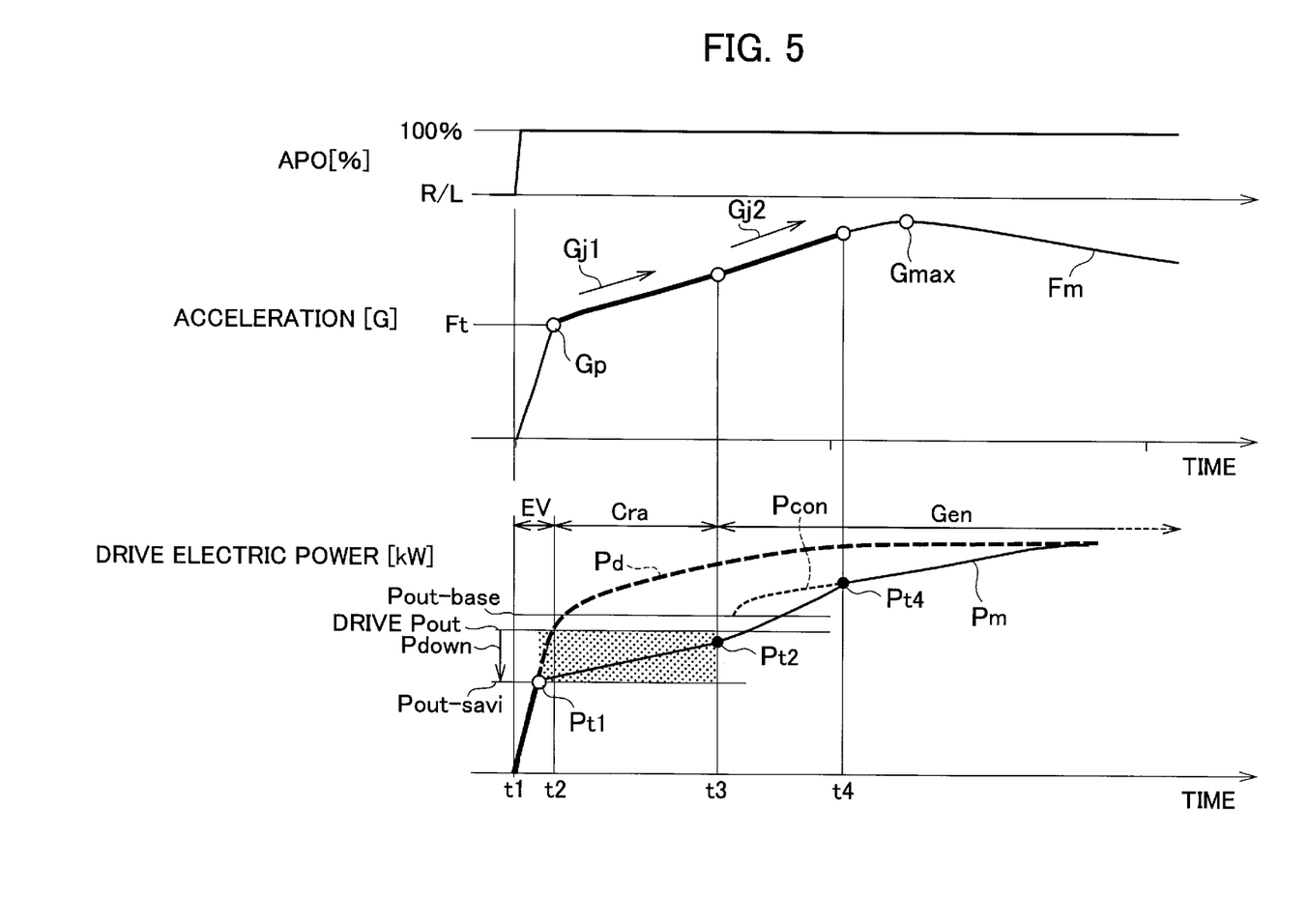
FIG. 5 is a timing chart illustrating changes in an accelerator opening degree APO, acceleration of the electric-powered vehicle, and electric power Pm supplied to a drive motor 6 over time.

Specifically, as illustrated in FIG. 5, a value obtained by subtracting electric power (accessory electric power) consumed by accessories such as an air conditioner, an audio device, and the like mounted in the vehicle and electric power (engine firing-up electric power) required to fire up the engine 1 from electric power Pout_base which can be supplied by the battery 5 is the electric power (drive Pout) which can be supplied by the battery 5 as the drive force of the vehicle. The drive Pout corresponds to the electric power which can be supplied by the battery 5 to drive the vehicle.

Note that, in the state where the engine is not rotating, the engine firing-up electric power corresponds to electric power (cranking electric power) required for a cranking process of the engine 1. In the state where the engine is already rotating, the engine firing-up electric power corresponds to electric power (recovery electric power) required for a recovery process of the engine 1.

As illustrated in FIG. 5, the stretchiness processor 24 causes power-saving electric power Pou_savi limited to a lower level than the drive Pout to be supplied from the battery 5 to the drive motor 6. The drive force Fm outputted by the drive motor 6 is thereby limited to a battery drive limit threshold Ft lower than maximum drive force determined from the electric power which can be supplied by the battery 5 to drive the vehicle.

Next, as illustrated by the arrow Gj1 (first gradient) of FIG. 5, the stretchiness processor 24 increases the drive force Fm outputted by the drive motor 6 by using the electric power supplied by the battery 5 over time, in a period from when the drive motor 6 outputs the drive force limited to the lower level (battery drive limit threshold Ft) to when the engine 1 is fired up and the power generator 4 starts power generation (t3).

Specifically, as illustrated in FIG. 5, after electric power Pm supplied from the battery 5 to the drive motor 6 reaches the power-saving electric power Pou_savi, the stretchiness processor 24 increases the electric power Pm supplied from the battery 5 to the drive motor 6 over time. The drive force Fm outputted by the drive motor 6 by using the electric power supplied by the battery 5 can be thereby increased over time as illustrated by the gradient Gj1 of FIG. 5. The increase rate of the electric power Pm from electric power Pt1 to electric power Pt2 can be calculated from the gradient Gj1 of FIG. 5 and the vehicle speed.

The stretchiness processor 24 sets the power-saving electric power Pou_savi and the increase rate of the electric power Pm from the electric power Pt1 to the electric power Pt2 such that the electric power Pt2 at the firing-up of the engine 1 and the start of the power generation by the power generator 4 (t3) is not greater than the drive Pout. The electric power Pm supplied from the battery 5 to the drive motor 6 can be thereby made to increase over time in the period (t1 to t3) from when the accelerator is stepped on to when the engine 1 is fired up and the power generator 4 starts the power generation. The drive force (drive torque) thereby increases over time without stagnation. Accordingly, acceleration G smoothly and continuously increases and this achieves smooth acceleration feeling. The smooth acceleration feeling or the acceleration feeling expected in response to the stepping-on of the accelerator is obtained and the stretchiness is suppressed. Thus, discomfort or frustration which may be felt by the driver or other occupants of the vehicle is eliminated.

The stretchiness processor 24 can set the power-saving electric power Pou_savi to a value obtained by subtracting surplus electric power Pdown, determined depending on the time required to fire up the engine 1, from the drive Pout. The battery drive limit threshold Ft can be thereby set to a value obtained by subtracting surplus drive force, determined depending on the time required to fire up the engine 1, from the maximum drive force determined from the electric power which can be supplied by the battery 5 to drive the vehicle. Thus, the battery drive limit threshold Ft can be accurately estimated. Note that the time required to fire up the engine 1 (cranking period Cra) is time (t2 to t3) required for firing-up determination of the engine 1 and the cranking process of the engine 1. The cranking period Cra can be estimated based on the engine oil temperature. "EV" in FIG. 5 denotes an EV state before the firing-up determination of the engine 1 and "Gen" denotes a power generation state after the firing-up of the engine 1.

The stretchiness processor 24 may determine the surplus electric power Pdown with reference not only to the time required to fire up the engine 1 but also the increase rate of the electric power Pm. In other words, the stretchiness processor 24 can set the power-saving electric power Pou_savi to a value obtained by subtracting the surplus electric power Pdown, determined based on the time required to fire up the engine 1 and the increase rate of the electric power Pm, from the drive Pout. Specifically, the stretchiness processor 24 calculates the surplus electric power Pdown by multiplying the increase rate of the electric power Pm by the time required to fire up the engine 1. The battery drive limit threshold Ft can be thereby set to a value obtained by subtracting the surplus drive force, determined depending on the time required to fire up the engine 1 and the first gradient (Gj1) of the drive force, from the maximum drive force determined from the electric power which can be supplied by the battery 5 to drive the vehicle. Thus, the battery drive limit threshold Ft can be more accurately estimated.

The maximum value of the electric power which can be supplied to the drive motor 6 before the firing-up of the engine 1 and the start of the power generation by the power generator 4 (to t3) is the drive Pout. Meanwhile, after the firing-up of the engine 1 and the start of the power generation by the power generator 4 (from t3), electric power Pcon generated by the power generator 4 is added to the drive Pout. Accordingly, electric power equal to or more than the drive Pout can be supplied to the drive motor 6. Then, the electric power Pm supplied to the drive motor 6 is set close to driver request electric power Pd by controlling the number of revolutions of the engine 1 to increase the electric power Pcon. Increasing the electric power Pm over time without stagnation also after the firing-up of the engine 1 and the start of the power generation by the power generator 4 (from t3) can smoothly increase the drive force Fm (drive torque) to its maximum value Gmax over time without stagnation.

Next, detailed functional configurations of the stretchiness processor 24 are described.

First, when the drive force (driver request drive force) which the drive motor 6 is requested to output is equal to the predetermined battery drive limit threshold Ft or higher than the battery drive limit threshold Ft, the control start determiner 31 determines that the stretchiness may occur and starts a process of suppressing the stretchiness. Specifically, the higher the accelerator opening degree APO is, the higher the drive force Fm which the drive motor 6 is requested to output is. When the driver request drive force is equal to or more than the battery drive limit threshold Ft, the control start determiner 31 starts the process of firing up the engine 1. When the drive force Fm is less than the battery drive limit threshold Ft, the control start determiner 31 does not start the process of firing up the engine 1. The need for firing-up the engine 1 can be thereby appropriately determined. Note that, in this case, no fuel is supplied to the engine 1 and the engine 1 is not in a combustion state. Moreover, the output shaft of the engine 1 is not rotating and the engine 1 is in a stopped state.

Moreover, when the drive force Fm which the drive motor 6 is requested to output becomes lower than the battery drive limit threshold Ft after the start of the process of firing up the engine 1, the control start determiner 31 suspends the process of firing up the engine 1. This corresponds to, for example, the case where the accelerator is stepped on and then released. The need for firing up the engine 1 can be thereby appropriately determined. Note that the battery drive limit threshold Ft used in the determination of the start and suspension of the process of firing up the engine 1 desirably has a certain hysteresis to suppress hunting and stabilize control of firing-up the engine 1.

The control start determiner 31 outputs the determination result of the engine firing-up to the Gj adder 33 and the power generation control unit 26 as a start determination flag. At the same time, the control start determiner 31 outputs the time required to fire up the engine 1 (cranking time) to the Gj adder 33 and the power generation control unit 26.

The Gj1 adder 34 calculates the battery drive limit threshold Ft. Specifically, the Gj1 adder 34 calculates the surplus electric power Pdown from the cranking time obtained from the engine oil temperature. Then, the Gj1 adder 34 subtracts the surplus electric power Pdown from the drive Pout to obtain the power-saving electric power Pou_savi and calculates the battery drive limit threshold Ft from the power-saving electric power Pou_savi and the vehicle speed.

The Gj1 adder 34 increases the drive force Fm at the first gradient (Gj1) after the drive force Fm reaches the battery drive limit threshold Ft. The increase of the drive force Fm at the first gradient (Gj1) is performed until the engine 1 is fired up (to t3). The amount of the increase of the drive force Fm at the first gradient (Gj1) corresponds to the surplus drive force determined depending on the time required to fire up the engine 1 and the surplus electric power Pdown is used for this increase. The Gj1 adder 34 calculates the increase rate of the electric power Pm required to increase the drive force Fm at the first gradient (Gj1).

The Gj2 adder 35 increases the drive force Fm at the second gradient (Gj2) after the firing-up of the engine 1 (from t3). The electric power (consumable electric power Pcon) generated by the power generator 4 is used for the increase of the drive force Fm at the second gradient (Gj2). The Gj2 adder 35 calculates the increase rate of the consumable electric power Pcon required to increase the drive force Fm at the second gradient (Gj2).

The Gj adder 33 sends the power-saving electric power Pou_savi, the increase rate of the electric power Pm required to increase the drive force Fm at the first gradient (Gj1), and the increase rate of the consumable electric power Pcon required to increase the drive force Fm at the second gradient (Gj2) to the safety determiner 25 and the power generation control unit 26.

When the battery drive limit threshold Ft is lower than predetermined minimum drive force Fa, the power generation requester 32 requests rotation of the output shaft of the engine 1. Low outside temperature, a poor state of charge (SOC) of the battery 5, or degradation of the battery 5 causes the drive Pout to decrease and thus also causes the battery drive limit threshold Ft to decrease. Since the possibility of the request of power generation to the power generator 4 increases with such a decrease, the output shaft of the engine 1 is rotated in advance to prepare for a future power generation request. Rotating the output shaft in advance can reduce the time required to fire up the engine 1 compared to that in the state where the output shaft is not rotated. In this case, "rotation of the output shaft" is a concept including not only firing control in which fuel is supplied to the engine and the engine is fired up but also motoring control in which the power generator 4 forcedly rotates the rotary shaft of the engine 1 to which fuel supply is cut-off.

The power generation requester 32 limits in advance the number of revolutions in the rotation of the output shaft of the engine 1 to the number of revolutions required for the power generator 4 to generate predetermined minimum generation electric power. This number of revolutions is the number of revolutions at which the power generator 4 can generate the minimum generation electric power when the power is generated at the maximum torque of the engine. In other words, the minimum value of the number of revolutions in the rotation of the output shaft of the engine 1 is set in advance to the number of revolutions required for the power generator 4 to generate the predetermined minimum generation electric power. The fuel supplied to the engine 1 for the rotation and the electric power consumed by the power generator 4 can be thereby secured.

The power generation requester 32 can determine the predetermined minimum generation electric power from the battery suppliable electric power and drive force which causes acceleration change of a predetermined degree or more. Specifically, the power generation requester 32 sets a difference between the electric power suppliable from the battery and the generation electric power required for the drive motor 6 to output drive force which causes a predetermined amount of change in acceleration, as a predetermined minimum generation electric power value. This can prevent frustration in which, when the amount of change in the acceleration is small, the driver cannot feel the acceleration G of the vehicle expected in response to the stepping-on of the accelerator.

The power generation requester 32 sets maximum generation electric power which is the maximum value of the electric power to be generated by the power generator 4 such that surplus electric power obtained by subtracting the electric power used in the vehicle from the electric power generated by the power generator 4 is equal to or less than electric power which can be stored in the battery 5. In other words, the power generation requester 32 can determine the maximum generation electric power from the electric power which can be stored in the battery 5. The electric power generated by the power generator 4 is limited to the maximum generation electric power or less. Specifically, the power generation requester 32 sets a predetermined maximum generation electric power value for the electric power to be generated by the power generator 4 such that the surplus electric power obtained when the generated electric power exceeds the electric power used in the vehicle can be made lower than the electric power which can be stored in the battery 5. In this case, the lower the electric power which can be stored in the battery 5 is, the lower the maximum generation electric power is set. This can preferentially prevent overcharging of the battery 5. When the "electric power which can be stored in the battery 5" is low, the overcharging of the battery 5 is prevented in preference to the frustration in which the driver cannot feel the acceleration G of the vehicle expected in response to the stepping-on of the accelerator, to suppress occurrence of failure in the battery 5.

The power generation requester 32 sends the request for the rotation of the output shaft of the engine 1, the maximum generation electric power, and the minimum generation electric power to the power generation control unit 26.

The safety determiner 25 determines whether the power-saving electric power Pou_savi, the increase rate of the electric power Pm required to increase the drive force Fm at the first gradient (Gj1), and the increase rate of the consumable electric power Pcon required to increase the drive force Fm at the second gradient (Gj2) satisfy conditions for safely operating the drive motor 6 and performs processes required for a safe operation on these parameters. After performing these determination and processes, the safety determiner 25 instructs the motor controller 12 about the power-saving electric power Pou_savi, the increase rate of the electric power Pm required to increase the drive force Fm at the first gradient (Gj1), and the increase rate of the consumable electric power Pcon required to increase the drive force Fm at the second gradient (Gj2).

The power generation control unit 26 instructs the engine controller 13 to fire up the engine 1 and instructs the engine controller 13 about the number of revolutions of the engine based on the increase rate of the consumable electric power Pcon required to increase the drive force Fm at the second gradient (Gj2). The power generation control unit 26 instructs the power generator controller 14 to rotate the output shaft of the engine 1 by the motoring control.

Figure 3:
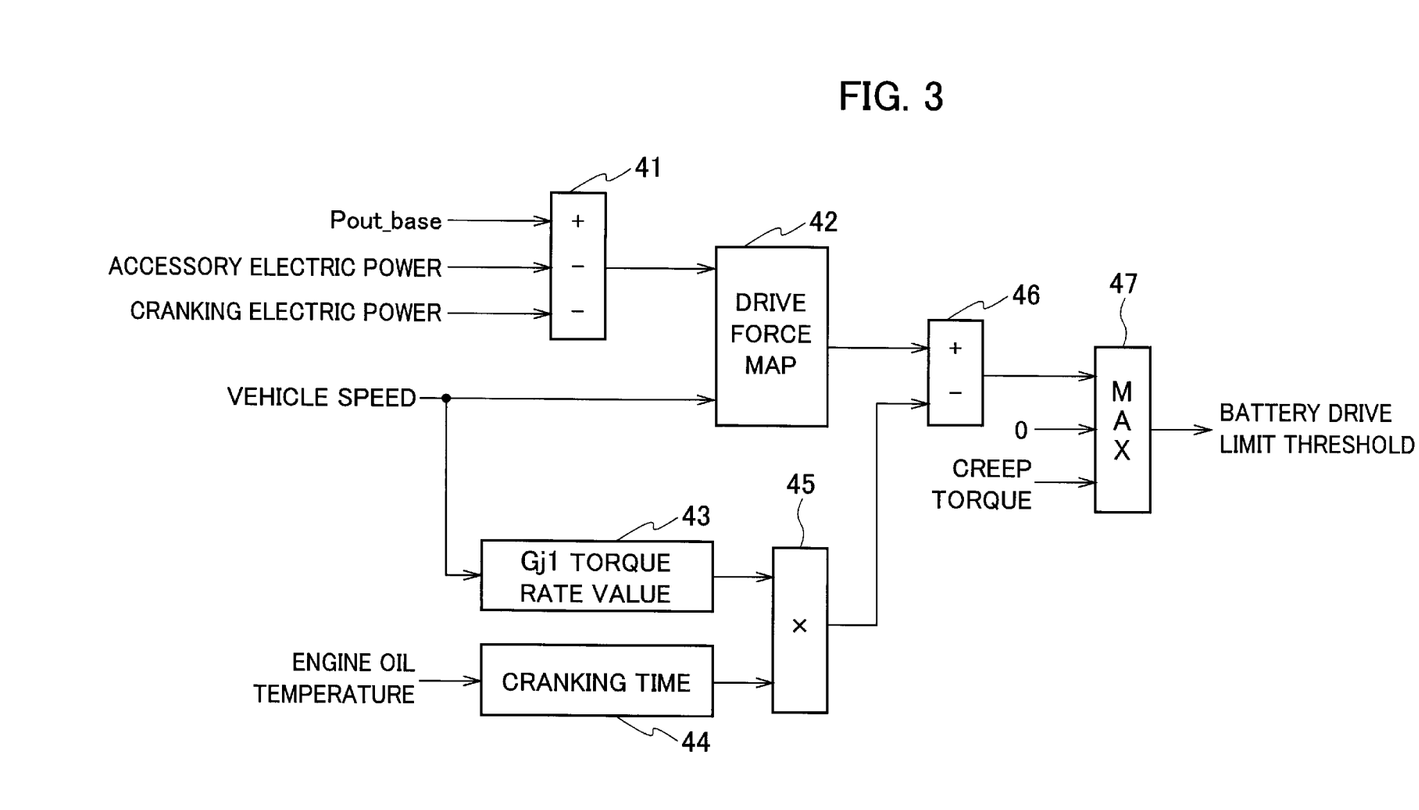
FIG. 3 is a flowchart illustrating processes of obtaining a battery drive limit threshold Ft.

Next, processes in which the stretchiness processor 24 obtains the battery drive limit threshold Ft are described with reference to the flowchart of FIG. 3.

In process 41, the stretchiness processor 24 obtains the drive Pout by subtracting the electric power (accessory electric power) consumed by the accessories and the cranking electric power (or the recovery electric power) from the electric power Pout_base.

In process 42, the stretchiness processor 24 obtains the drive force (drive torque) of the vehicle obtained from the drive Pout, from the vehicle speed and the drive Pout by using the drive force map.

In process 45, the stretchiness processor 24 obtains the surplus drive force by multiplying the first gradient Gj1 (Gj1 torque rate value 43) by the time required to fire up the engine 1 (cranking time 44). In process 46, the stretchiness processor 24 obtains the battery drive limit threshold Ft by subtracting the surplus drive force from the drive force of the vehicle obtained from the drive Pout.

In process 47, the stretchiness processor 24 compares the battery drive limit threshold Ft, the creep torque, and zero and selects the greatest value among these values. In other words, the stretchiness processor 24 sets the battery drive limit threshold Ft to a value on the power running side and greater than the drive force outputted by the drive motor 6 in a state where the accelerator of the vehicle is off. This can prevent the engine 1 from continuing to run in the off state of the accelerator. Moreover, the drive motor 6 can be maintained in a state where the drive motor 6 outputs positive torque, that is in the power running state.

The stretchiness processor 24 can obtain the battery drive limit threshold Ft through the aforementioned processes.

Figure 2:
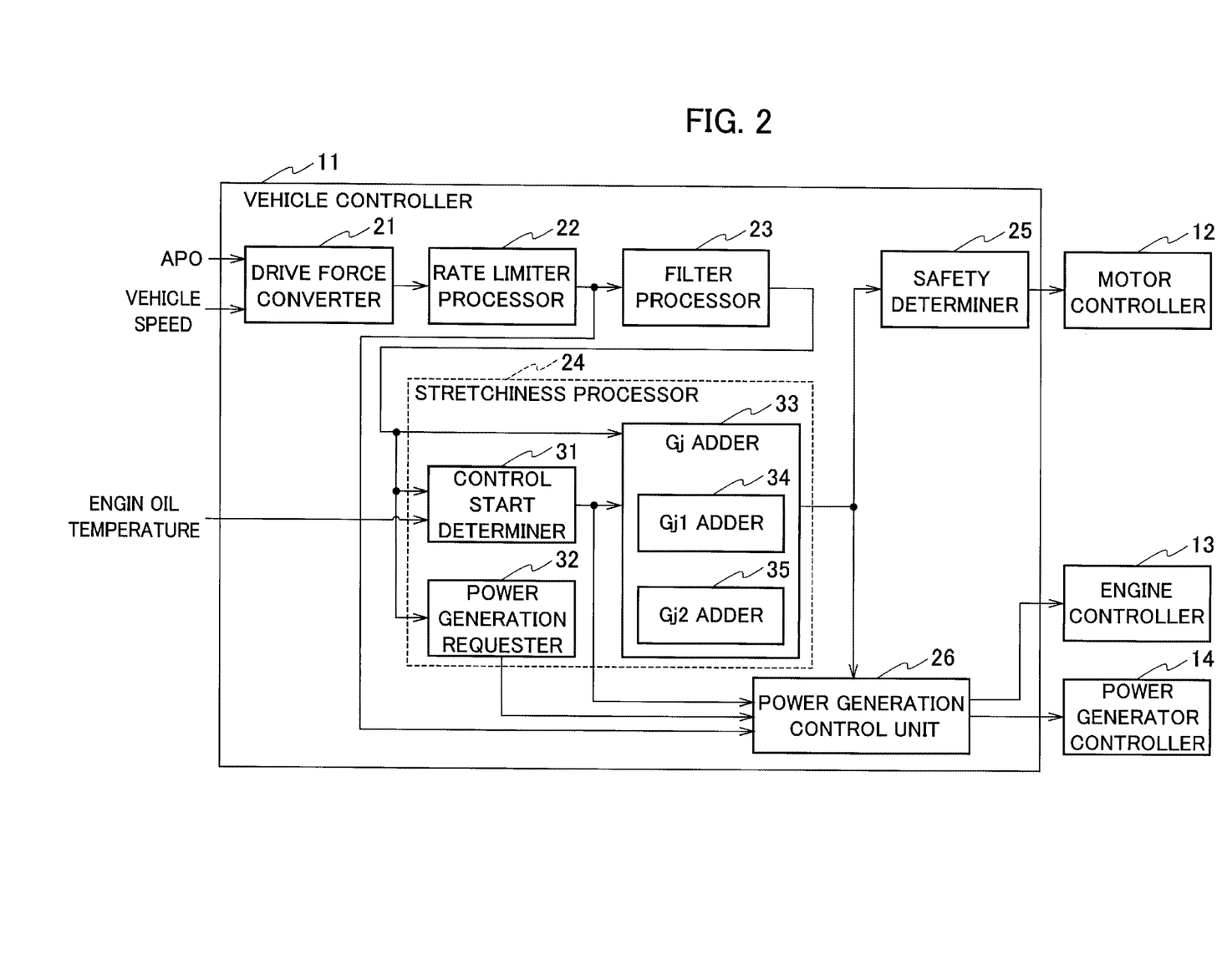
FIG. 2 is a block diagram illustrating functional components included in the vehicle controller 11.
Figure 4:
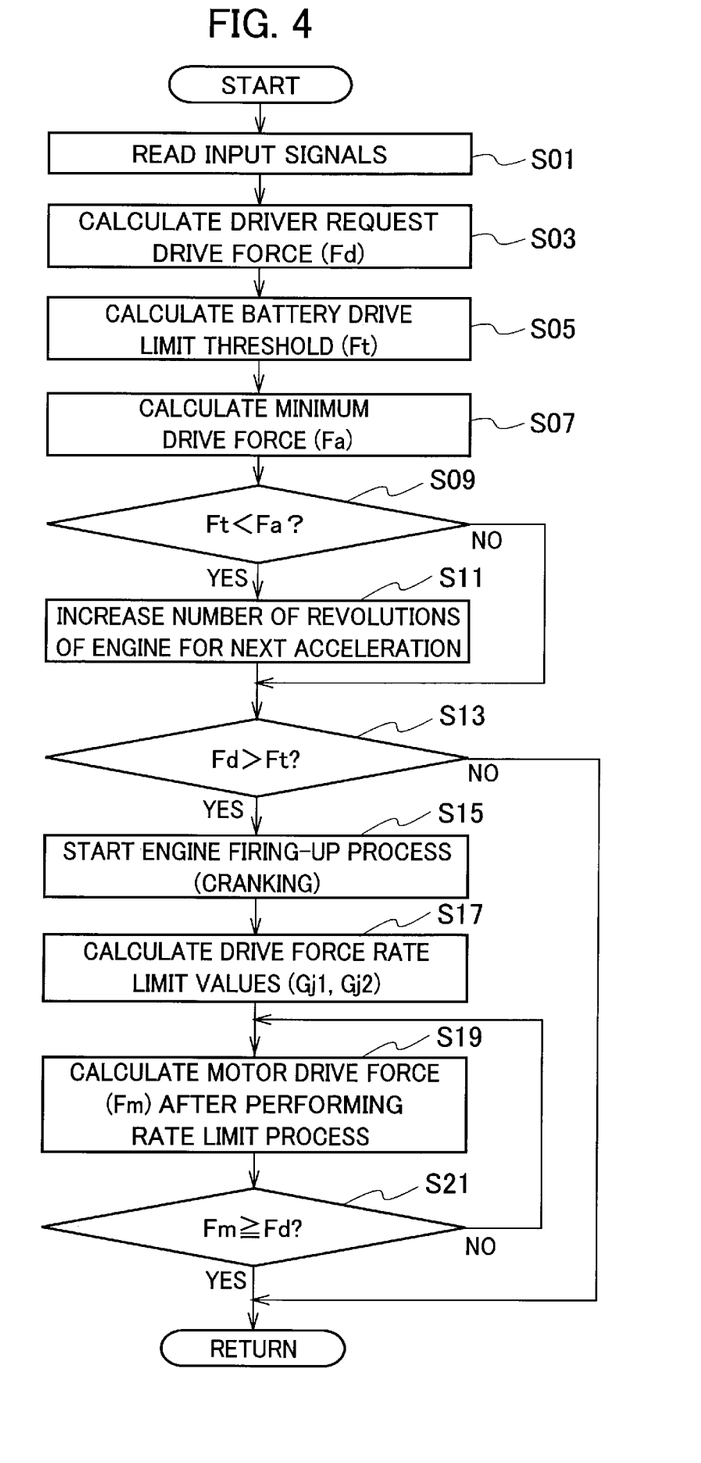
FIG. 4 is a flowchart illustrating an operation example of the vehicle controller 11 in FIG. 2.

An operation example (vehicle control method) of the vehicle controller 11 in FIG. 2 is explained with reference to the flowchart of FIG. 4.

In step S01, the vehicle controller 11 reads input signals indicating the accelerator opening degree APO, a shift position, the vehicle speed, the engine oil temperature, the state of charge (SOC) of the battery 5, and the electric power Pout_base.

Proceeding to step S03, the vehicle controller 11 calculates the driver request drive force Fd based on the accelerator opening degree, the vehicle speed, and the shift position. Proceeding to step S05, the vehicle controller 11 calculates the battery drive limit threshold Ft and, proceeding to step S07, calculates the minimum drive force Fa.

Proceeding to step S09, the vehicle controller 11 (power generation requester 32) determines whether the battery drive limit threshold Ft is lower than the minimum drive force Fa. When the determination result is yes (YES in S09), the operation proceeds to step S11 and, when the determination result is no (NO in S09), the operation proceeds to step S13.

In step S11, the vehicle controller 11 (power generation requester 32) requests the rotation of the output shaft of the engine 1. Since the possibility of the power generation request to the power generator 4 increases when the battery drive limit threshold Ft is low, the output shaft of the engine 1 is rotated in advance to prepare for a future power generation request. Thereafter, the operation proceeds to step S13.

In step S13, the vehicle controller 11 determines whether the driver request drive force Fd is higher than the battery drive limit threshold Ft. When the determination result is yes (YES in S13), the vehicle controller 11 determines that there is possibility of occurrence of stretchiness and causes the operation to proceed to step S15. Meanwhile, when the determination result is no (NO in S13), the vehicle controller 11 determines that there is no possibility of occurrence of stretchiness and the flowchart of FIG. 4 is terminated.

In step S15, the vehicle controller 11 starts the process of suppressing the stretchiness, specifically the process of firing up the engine 1 (cranking process or recovery process). In step S17, the vehicle controller 11 calculates the drive force rate limit values (Gj1, Gj2) by referring to the vehicle speed. Preceding to step S19, the Gj adder 33 calculates the drive force Fm subjected to the rate limit process in which the gradients (Gj1, Gj2) of the drive force in the acceleration are limited.

Proceeding to step S21, the vehicle controller 11 determines whether the drive force Fm has reached the driver request drive force Fd. When the determination result is yes (YES in S21), the control by the vehicle controller 11 is terminated. When the determination result is no (NO in S21), the operation returns to step S19.

Figure 6:
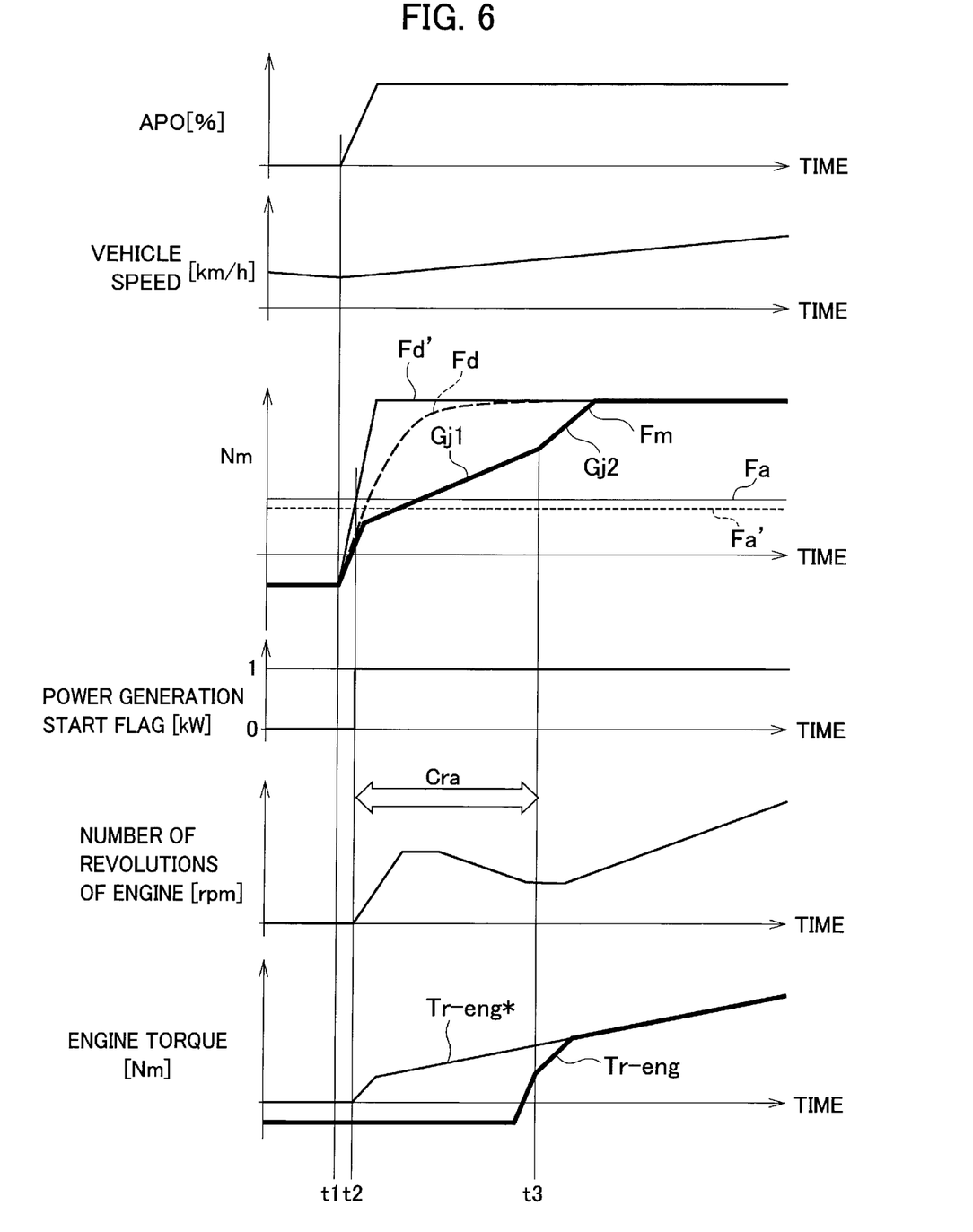
FIG. 6 is a timing chart illustrating changes in parameters according to the embodiment over time in the case where an engine 1 is not rotating.

Changes in the respective parameters over time when the accelerator is stepped on in the state where the engine 1 is not rotating (an example of the "state where the engine 1 is stopped") are described with reference to the timing chart of FIG. 6. The accelerator opening degree APO increases due to the stepping-on of the accelerator (t1). In response to this, the driver request drive forces (Fd, Fd') increase. The driver request drive force Fd is a parameter obtained by subjecting the driver request drive force Fd' to the rate limit process performed by the rate limiter processor 22 and the filter processor 23.

The drive force Fm outputted by the drive motor 6 also increases in response to the driver request drive force Fd after lapse of response time. When the driver request drive force Fd exceeds the battery drive limit threshold Ft (t2), the power generation start flag changes from a logical value 0 to a logical value 1 and the process of firing up the engine 1 (cranking period: Cra) is started. The number of revolutions of the engine 1 thereby increases. With this increase, a target drive force Tr_eng* of the engine 1 increases. Note that, in the cranking period Cra, actual drive force Tr_eng actually outputted by the engine 1 is a negative value.

The increase of the drive force Fm is limited to the battery drive limit threshold Ft (not illustrated). The drive force Fm outputted by the drive motor 6 increases at the first gradient Gj1 in the period from when the drive force Fm reaches the battery drive limit threshold Ft to when the engine 1 is fired up (t2 to t3). The drive force Fm outputted by the drive motor 6 increases at the second gradient Gj2 after the firing-up of the engine 1 (from t3). Regarding the first gradient Gj1 and the second gradient Gj2 which each indicate an increase amount of the drive force Fm per unit time, the first gradient Gj1 is set to be smaller than the second gradient Gj2.

The first gradient Gj1 of the drive force Fm outputted by the drive motor 6 in the period from when the drive motor 6 outputs the drive force limited to the lower level (battery drive limit threshold Ft) to when the engine 1 is fired up and the power generator 4 starts the power generation (t2 to t3) is set to be smaller than the second gradient Gj2 of the drive force outputted by the drive motor 6 after the start of the power generation by the power generator 4 (from t3). Even smoother acceleration feeling can be thereby obtained and discomfort or frustration which may be felt by the driver or other occupants of the vehicle is eliminated.

The increase of the drive force Fm at the second gradient Gj2 continues until the drive force Fm reaches the driver request drive force Fd. Note that, after the start of the power generation by the power generator 4 (from t3), the actual drive force Tr_eng is on the power running side and the number of revolutions of the engine increases over time. Moreover, the vehicle speed increases over time with the generation and increase of the drive force Fm.

Figure 7:
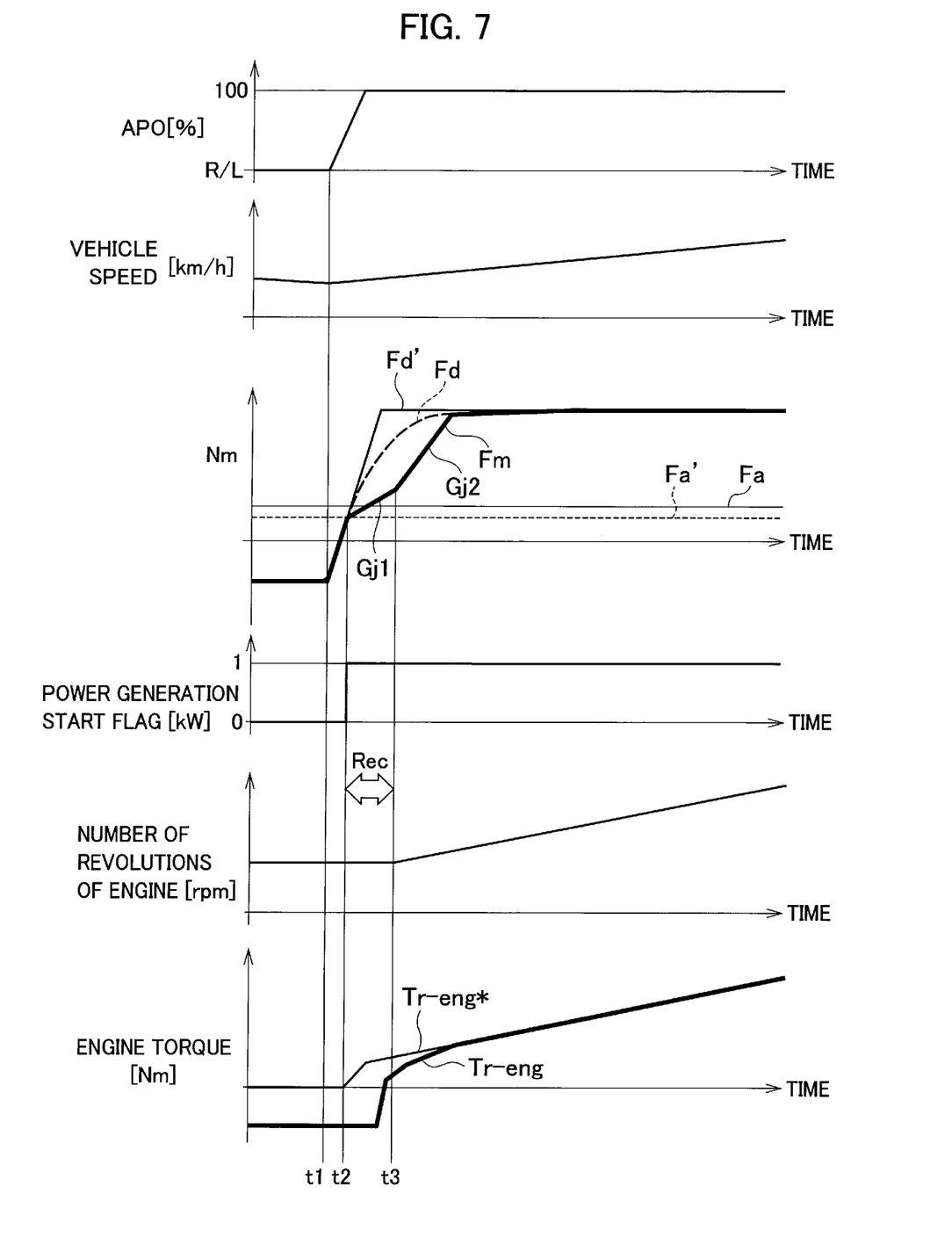
FIG. 7 is a timing chart illustrating changes in the parameters according to the embodiment over time in the case where the engine 1 is rotating.

Changes in the respective parameters over time when the accelerator is stepped on in the state where the engine 1 is rotating (another example of the "state where the engine 1 is stopped") are described with reference to the timing chart of FIG. 7. The process of firing up the engine 1 (recovery period) is different from that in FIG. 6. The recovery period Rec of FIG. 7 is shorter than the cranking period Cra of FIG. 6. Accordingly, the time from when the power generation start flag changes from 0 to 1 to when the power generation is started (t2 to t3) is shorter than that in FIG. 6 and the first gradient Gj1 of the drive force Fm is greater than that in FIG. 6. Since the second gradient Gj2 is greater than the first gradient Gj1, the second gradient Gj2 of the drive force Fm is also greater than that in FIG. 6. As a result, the driver force Fm reaches the driver request drive force Fd in shorter time than in FIG. 6. Other points of the timing chart of FIG. 7 are the same as those of FIG. 6 and description thereof is omitted. The "state where the engine 1 is stopped" means the state where the engine 1 is not fired up, that is the state where no fuel is supplied to the engine 1. In the "state where the engine 1 is stopped," whether the output shaft of the engine 1 is rotating or not does not matter.

Figure 8:
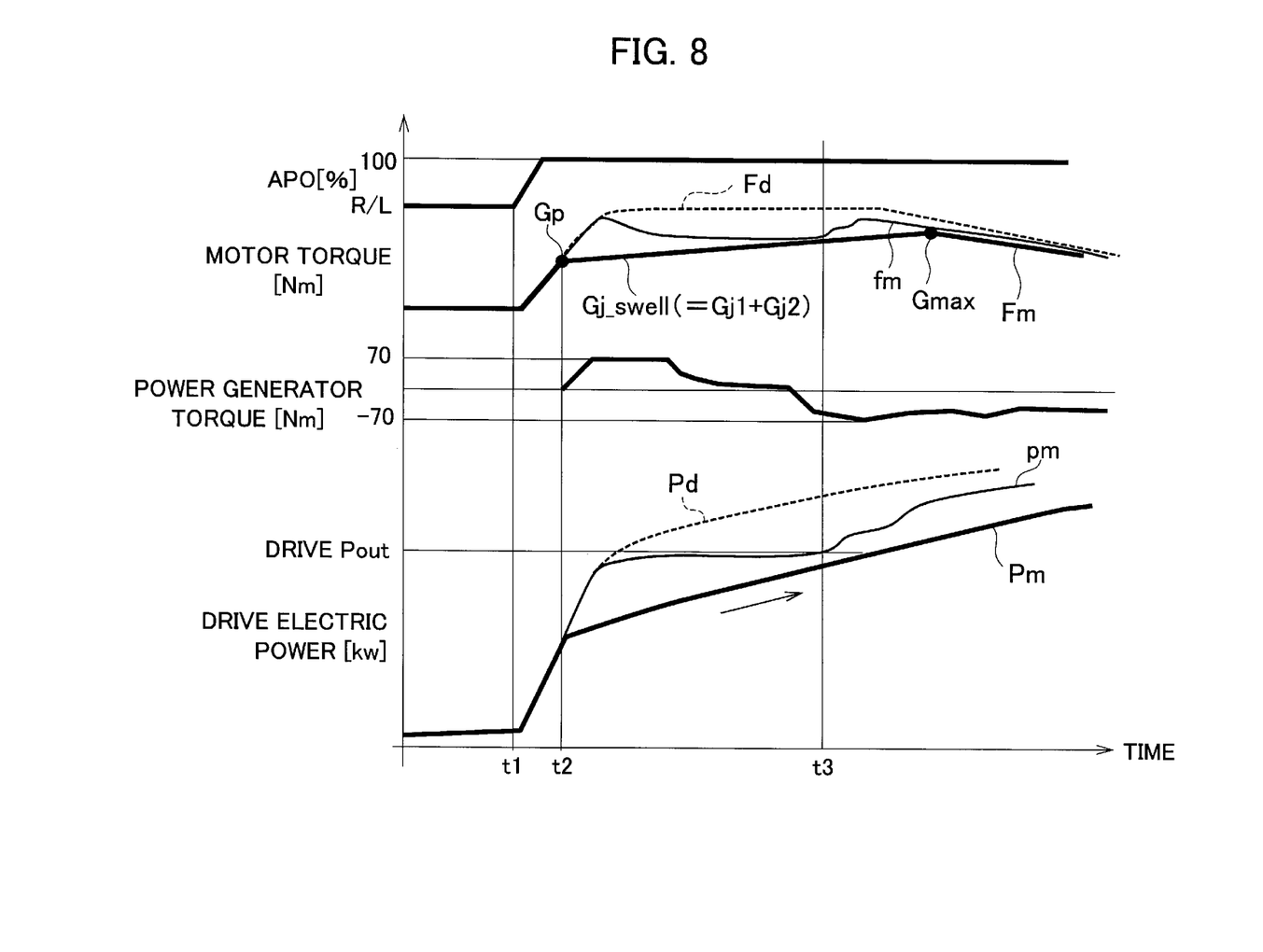
FIG. 8 is a timing chart explaining operations and effects of the embodiment.

Operations and effects of the embodiment are described with reference to the timing chart of FIG. 8. A curve Pm illustrates a change in electric power pm over time according to a comparative example and a curve Pm illustrates a change in electric power Pm over time according to the embodiment. A curve fm illustrates a change in drive force (drive torque fm) over time according to the comparative example and a curve Fm illustrates a change in drive force (drive torque Fm) over time according to the embodiment. The electric power refers to the electric power supplied to the drive motor 6.

The driver request electric power Pd increases and exceeds the drive Pout due to rising of the accelerator opening degree APO. The electric power pm of the comparative example increases to the drive Pout along the driver request electric power Pd. When the electric power pm increases to the drive Pout, the engine 1 is not fired up yet and thus the power generation is not started. Accordingly, the electric power pm of the comparative example stagnates around the drive Pout until the power generation is started (to t3).

Accordingly, the drive torque fm according to the comparative example increases to a certain value by the increase of the electric power pm to the drive Pout but then decreases due to the stagnation of the electric power pm and starts to increase again when the engine 1 is fired up. As described above, the shape of the curve illustrating the change in the drive torque fm over time according to the comparative example is not similar to the shape of the curve illustrating the change in the driver request drive force Fd over time. In the curve of the drive torque fm according to the comparative example, the drive torque fm repeats rising and falling and it cannot be said that the drive torque fm smoothly and continuously increases. Accordingly, the smooth acceleration feeling or the acceleration feeling expected in response to the stepping-on of the accelerator cannot be obtained and the driver or other occupants of the vehicle feels discomfort or frustration in some cases.

Meanwhile, the electric power Pm of the embodiment increases along the driver request electric power Pd but the increase is limited to a value lower than the drive Pout (power-saving electric power Pou_savi). Then, in the period from when the electric power Pm limited to the level lower than the drive Pout is supplied to the drive motor 6 to when the engine 1 is fired up and the power generator 4 starts the power generation (t2 to t3), the electric power Pm supplied by the battery 5 is made to increase over time as illustrated by the arrow of FIG. 8. In this case, the increase rate of the electric power Pm and the power-saving electric power Pou_savi are set such that the electric power Pm at the firing-up of the engine 1 and the start of the power generation by the power generator 4 (t3) is not greater than the drive Pout.

The drive torque Fm according to the embodiment thereby increases over time without stagnation until the engine 1 is fired up (to t3). The shape of the curve illustrating the change in the drive torque Fm over time according to the embodiment is similar to the shape of the curve illustrating the change in the driver request drive force Fd over time. In the curve of the drive torque Fm according to the embodiment, the drive torque Fm smoothly and continuously increases. Accordingly, it is possible to obtain the smooth acceleration feeling or the acceleration feeling expected in response to the stepping-on of the accelerator and suppress the discomfort or frustration felt by the driver or other occupants of the vehicle.

Although the contents of the present invention are described above according to the embodiment, it is apparent to those skilled in the art that the present invention is not limited to the above description and various modifications and improvements can be made. The statements and drawing forming part of this disclosure should not be understood to limit the present invention. Various alternative embodiments, examples, and operation techniques are apparent to those skilled in the art from this disclosure.

The present invention includes various embodiments and the like which are not described herein as a matter of course. Accordingly, the technical scope of the present invention is determined only by the matters specifying the invention according to the claims regarded as appropriate from the aforementioned description.

The functions described in the aforementioned embodiment may be implemented by one or multiple processing circuits. The processing circuits include programed processing devices such as processing devices including electric circuits. Moreover, the processing circuits include devices such as application specific integrated circuit (ASIC) and conventional circuit parts which are arranged to execute the functions described in the embodiment.

REFERENCE SIGNS LIST 1 engine (internal combustion engine)
4 power generator (first electric motor)
5 battery
6 drive motor (second electric motor)
Fa minimum drive force
Fd drive force which second electric motor is requested to output
Ft battery drive limit threshold
Gj1 first gradient of drive force
Gj2 second gradient of drive force

The invention claimed is:
1. A vehicle control method for a vehicle control device configured to control an electric-powered vehicle including:
an internal combustion engine;
a first electric motor mechanically connected to an output shaft of the internal combustion engine;
a battery electrically connected to the first electric motor; and
a second electric motor electrically connected to the battery and mechanically connected to a drive wheel included in the electric-powered vehicle and configured to drive the drive wheel by using electric power generated by the first electric motor and electric power supplied from the battery, the vehicle control method comprising:
when the internal combustion engine is stopped and when a drive force requested to be outputted from the second electric motor increases, limiting the drive force outputted from the second electric motor by limiting electric power supplied by the battery to a lower level that is less than a maximum drive force which the battery is capable of supplying; and
increasing the drive force outputted from the second electric motor by using the electric power supplied by the battery over a time period beginning when the electric power supplied by the battery is limited and ending when the internal combustion engine is fired up and the first electric motor starts power generation.

2. The vehicle control method for the vehicle control device according to claim 1, wherein the drive force limited to the lower level is a battery drive limit threshold which is a value obtained by subtracting a surplus drive force from the maximum drive force, the surplus drive force determined depending on a time required to fire up the internal combustion engine.

3. The vehicle control method for the vehicle control device according to claim 1, wherein the drive force limited to the lower level is a battery drive limit threshold which is a value obtained by subtracting a surplus drive force from the maximum drive force, the surplus drive force determined depending on a time required to fire up the internal combustion engine and a first gradient of the drive force.

4. The vehicle control method for the vehicle control device according to claim 2, wherein when the drive force requested to be outputted from the second electric motor is equal to or greater than the battery drive limit threshold, starting a process of firing up the internal combustion engine.

5. The vehicle control method for the vehicle control device according to claim 4, wherein when the drive force requested to be outputted from the second electric motor becomes lower than the battery drive limit threshold after a start of the process of firing up the internal combustion engine, suspending the process of firing up the internal combustion engine.

6. The vehicle control method for the vehicle control device according to claim 2, wherein when the battery drive limit threshold is lower than a predetermined minimum drive force, rotating the output shaft of the internal combustion engine.

7. The vehicle control method for the vehicle control device according to claim 2, wherein the battery drive limit threshold is on a power running side and is greater than the drive force outputted by the second electric motor when an accelerator of the electric-powered vehicle is off.

8. The vehicle control method for the vehicle control device according to claim 6, wherein a number of revolutions of the output shaft of the internal combustion engine is limited to a number of revolutions required for the first electric motor to generate a predetermined minimum generation electric power.

9. The vehicle control method for the vehicle control device according to claim 6, wherein a first gradient of the drive force outputted by the second electric motor in the time period is set to be smaller than a second gradient of the drive force outputted by the second electric motor after the first electric motor starts the power generation.

10. The vehicle control method for the vehicle control device according to claim 8, wherein the predetermined minimum generation electric power is determined from a drive force which causes an acceleration change of a predetermined degree or more.

11. The vehicle control method for the vehicle control device according to claim 1, further comprising determining a maximum generation electric power, which is a maximum value of an electric power to be generated by the first electric motor depending on an electric power storable in the battery.

12. The vehicle control method for the vehicle control device according to claim 2, wherein the battery drive limit threshold is reduced as an outside air temperature falls.

13. A vehicle control device configured to control an electric-powered vehicle, the vehicle control device including:

an internal combustion engine;

a first electric motor mechanically connected to an output shaft of the internal combustion engine;

a battery electrically connected to the first electric motor; and a second electric motor electrically connected to the battery and mechanically connected to a drive wheel included in the electric-powered vehicle and configured to drive the drive wheel by using electric power generated by the first electric motor and electric power supplied from the battery, wherein when the internal combustion engine is stopped and when a drive force is requested to be outputted from the second electric motor increases, the vehicle control device limits the drive force outputted from the second electric motor by limiting electric power supplied by the battery to a lower level that is less than a maximum drive force which the battery is capable of supplying, and the vehicle control device increases the drive force outputted from the second electric motor by using the electric power supplied by the battery over a time period beginning when the electric power supplied by the battery is limited and ending when the internal combustion engine is fired up and the first electric motor starts power generation.

* * * * *